United States Patent
Gohman et al.

[19]
[11] Patent Number: 5,978,051
[45] Date of Patent: Nov. 2, 1999

[54] IMAGE PROJECTION SYSTEM WITH VARIABLE DISPLAY FORMAT

[76] Inventors: Jeffrey A. Gohman, 21525 Ornduff Rd., Hillsboro, Oreg. 97123; Michael G. West, 11015 SW. Palatine Ct., Portland, Oreg. 97219

[21] Appl. No.: 08/741,950

[22] Filed: Oct. 31, 1996

[51] Int. Cl.$^6$ ............................... H04N 5/74; G02F 1/00
[52] U.S. Cl. ............................ 348/766; 349/62; 349/5; 353/85; 362/281
[58] Field of Search ................................. 348/766, 744, 348/759, 760, 761, 751, 755, 756, 781, 782, 785; 349/7, 5, 61, 62–67; 353/85, 97, 37, 34; 362/268, 285, 281; H04N 5/74; G02F 1/00

[56] References Cited

U.S. PATENT DOCUMENTS 5,519,518  5/1996  Watanabe et al. .................. 349/57
5,709,463  1/1998  Igram .................................. 362/218
5,786,873  7/1998  Chiu et al. .......................... 348/756

*Primary Examiner*—Michael H. Lee
*Attorney, Agent, or Firm*—Timothy M. Carlson

[57] ABSTRACT

An image projector is provided with a light source and a light valve positioned downstream of the light source. An optical path is defined between the light source and the light valve. To accommodate various image viewing formats, a plurality of optical integrators is positioned between the light source and the light valve. Each of the plurality of optical integrators is movable laterally of the optical path and is positionable in the optical path. Light from the light source is transmitted to the light valve through the particular optical integrator positioned in the optical path. Each optical integrator is constructed to produce a unique display format for the light transmitted therethrough to the light valve, in order the accommodate different display formats such as standard and letter-box without wasting light.

14 Claims, 3 Drawing Sheets

IMAGE PROJECTION SYSTEM WITH VARIABLE DISPLAY FORMAT

FIELD OF THE INVENTION

The present invention pertains to an image projection system, in particular to optical path components for projecting images of variable format.

BACKGROUND AND SUMMARY OF THE INVENTION

Projection systems have been used for years to project motion pictures and still photographs onto display screens. More recently, presentations using multimedia projection systems have become popular for purposes such as sales demonstrations, business meetings, and classroom sessions. In a common mode of operation, multimedia projection systems receive analog video signals from a personal computer (PC). The video signals represent still, partial-, or full-motion display images of the type rendered by the PC. The analog video signals are converted into digital video signals to control a digitally-driven light valve, such as a reflective light valve or a transmissive liquid crystal light valve (LCD), which form display images.

A popular type of multimedia projection system is a projector that incorporates a light source and optical path components upstream and downstream of the light valve to project the display images onto a display screen. Examples such projectors include those sold under the trademark LITEPRO® by In Focus Systems, Inc. of Wilsonville, Oreg., the assignee of the present application.

It is increasingly necessary that projectors be capable of projecting electronic images in a variety of formats. Two of the most common formats are the 3×4 standard screen format and the 16×9 "letterbox" format. The letterbox format is utilized in some laser-disc based videos and is proposed for use in high-definition television (HDTV).

While conventional projectors are capable of handling both standard and letterbox formats, they do so with a penalty in optical efficiency. For example, the optical systems of conventional projectors are usually designed for standard format projection, and letterbox format projection is accomplished by "blanking" pixels in upper and lower margin portions of the light valve. In the case of a transmissive light valve, the blanked margins block light while the active central portion of the light valve modulates and passes light, producing a letterbox-sized display field. In the case of a reflective light valve, the blanked margins block light by reflecting it away from the projection path, and the active central portion of the light valve modulates and reflects light along the projection path, producing a letterbox-sized display field.

In both cases, the light blocked by the upper and lower blanked margin portions is wasted, thereby compromising projector brightness in the letterbox mode. Such decrease in projector brightness is a serious disadvantage. For instance, even in standard display format without letterbox blanking, the optical efficiency of many projectors is such that the projectors are only marginally bright enough to produce good image quality in a well-lit room. Thus, the additional loss of light attending letterbox blanking is undesirable.

Thus, in light of these disadvantages, it is a principle object of the present invention to provide a projector capable of standard and letterbox format projection, without loss of brightness in the letterbox display format.

It is another object of the present invention to provide a projector with a simple system for converting between standard and letterbox formats.

In accordance with a preferred embodiment of the present invention an image projector is provided with a light source and a light valve positioned downstream of the light source. An optical path is defined between the light source and the light valve. To accommodate various image display formats, a plurality of optical integrators is positioned between the light source and the light valve. Each of the plurality of optical integrators is movable laterally of the optical path and is positionable in the optical path. Light is transmitted from the light source to the light valve through the particular optical integrator positioned in the optical path. Each optical integrator is constructed to produce a unique display format for light transmitted therethrough to the light valve.

Accordingly, in one preferred embodiment of the present invention a first and a second optical integrators are provided to accommodate both standard and letterbox viewing formats without waste of light.

DETAILED DESCRIPTION OF PREFERRED EMBODIMENTS

Figure 1:
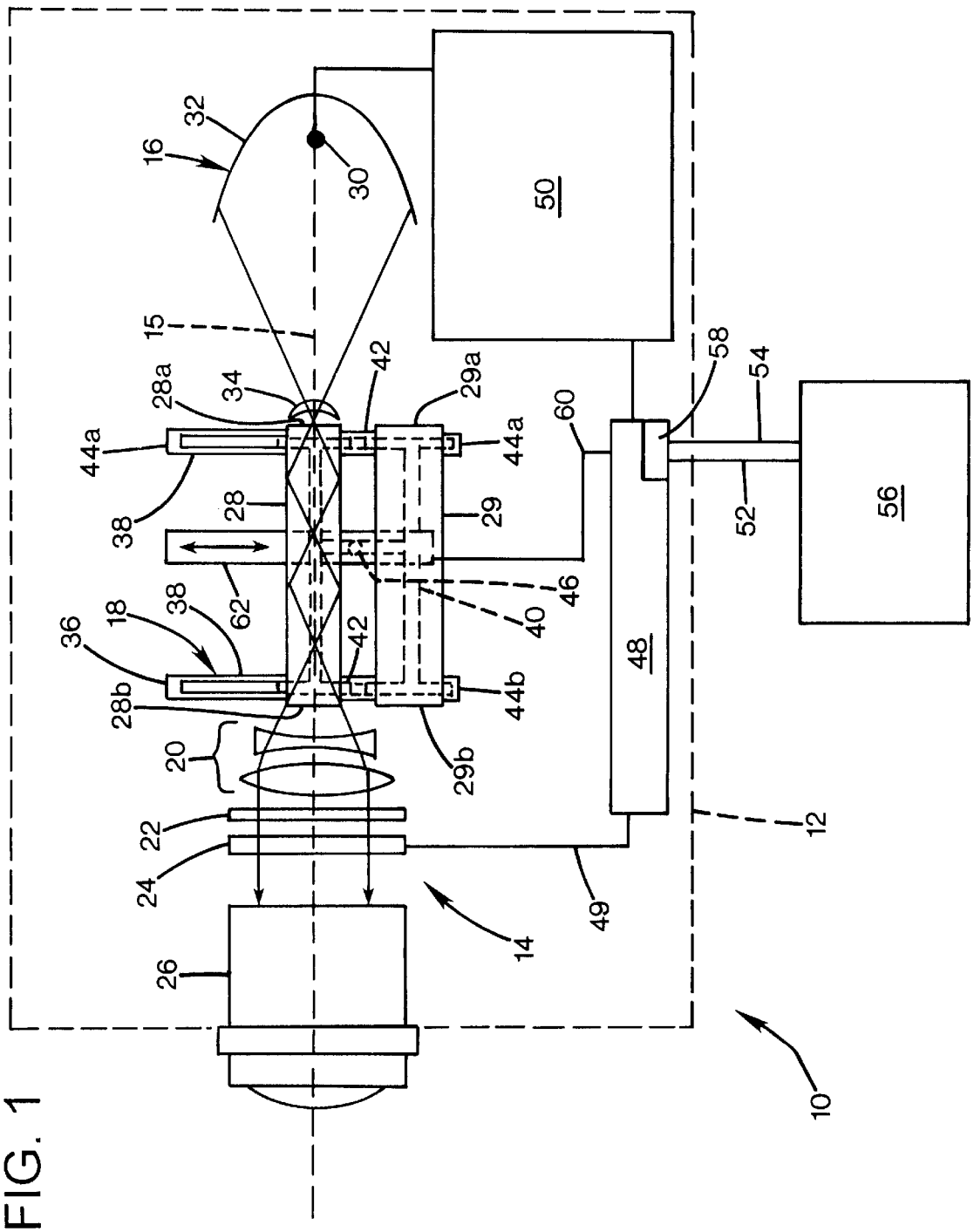
FIG. 1 is a top plan, partially cutaway view of portion of a variable format projection optical system according to one preferred embodiment of the present invention.

FIG. 1 generally shows an image projector 10 in accordance with one preferred embodiment of the present invention. The projector includes a housing 12 that supports a variable format projection optical system 14. The optical system, from back to front along an optical path (in this case an axis) 15, includes a light source 16, a variable display format device 18, a collimating optics group 20, a polarizer 22, a transmissive light valve 24, and a telecentric-type projection lens 26. As will be discussed, the variable display format device includes a first and a second optical integrators 28, 29 that are selectively registered with the optical axis 15 to selectively vary the display format of the optical system 14.

The image projector depicted in FIG. 1 will now be described in detail, from the light source 16 forward. The light source 16 is preferably a metal halide lamp 30 housed within an elliptical mirror 32. An optional meniscus lens 34 may be disposed downstream of the elliptical mirror 32 to boost the concentration of light focused by the elliptical mirror.

The optical integrators 28, 29 are elongated with squared-off flat upstream and downstream end surfaces 28a, 29a and 28b, 29b. The first optical integrator 28 has a 3×4 cross-section to provide a 3×4 projection display format, and the second optical integrator 29 has a 9×16 cross-section to provide a 9×16 projection display format.

The optical integrators 28, 29 preferably have a single transparent dielectric core, which in combination with cladding preferably provides a high numerical aperture (NA), permitting compact light gathering, and total internal reflection for efficient light transmission. The light pipe NA is preferably matched to the NA of the elliptical mirror/meniscus lens system 32, 34. In order to provide total internal reflection, the physical structure of the optical integrator wall is a reflective optical interface, i.e. the boundary of two different optical materials. The illustrated nonimaging device wall forms a dielectric (e.g. acrylic)-air boundary. The optical integrators may be constructed of various suitable materials, such as glass or acrylic with or without a cladding. It is also to be understood that effective nonimaging devices having other boundary types may be constructed, such as air- metal, dielectric-metal, and dielectric-dielectric.

In order to appropriately integrate the light (i.e. to provide a uniform light intensity across the projection field), the optical integrator has a length such that sufficient reflections of light within the optical integrator occur. An optical integrator of high NA permits a shorter optical integrator by permitting increased reflections per given length optical integrator.

The variable display format device 18 is situated such that the upstream ends 28a, 29a of the optical integrators 28, 29 are registerable with the optical axis 15 at the focus of the meniscus lens 34 and elliptical mirror 32 system. The optical integrators 28, 29 are mounted on a frame 36 for selective movement lateral of the optical axis 15. The frame 36 may include a pair of tracks 38 that extend perpendicular of the optical axis 15. As shown in FIG. 1, the tracks 38 may be grooved. The optical integrators 28, 29 are mounted together on a sled 40, which has extensions 42 that are received within the grooved tracks 38, to permit sliding movement of the sled perpendicular of the optical axis 15.

In the preferred embodiment, the tracks have closed ends 44a, 44b that provide stops for the sled at either end of the tracks. As shown in FIG. 1, the tracks 38 are dimensioned such that the first optical integrator 28 is centrally registered with the optical axis 15 when the sled 40 is stopped against the second end 44b of the tracks. The second optical integrator 29 is centrally aligned with the optical axis 15 when the sled is stopped against the first end 44a of the tracks. An actuator post 46 may extend from the sled and through the projector housing 12, to permit manual selective registration of the first and second optical integrators 28, 29 with the optical axis.

The collimating optics group 20 is positioned along the optical axis downstream of the variable display format device 18. The collimating optics group usually includes a number of positive and negative lenses. The polarizer 22 appropriately polarizes light for modulation by the transmissive light valve 24, which preferably is of liquid crystal display (LCD) type. A light valve drive electronics unit 48 containing a CPU is mounted to the frame and is electrically connected to the light valve 24. A power supply 50 provides appropriate electrical power for the light source 16 and the electronics unit 48. The collimated, modulated light transmitted from the light valve 24 passes through the telecentric projection lens 26 for projection onto a display screen.

It is also contemplated that the optical integrators may be automatically movable to accommodate the format of the image data being projected. In one preferred embodiment, a source cable carrying $H_{sync}$ and $V_{sync}$ signal conductors 52, 54 connects a multimedia source 54 (such as a VCR) to the projector 10. A mode identification counter 58, which may be a part of the drive electronics unit 48, derives the display format of the VCR video data by monitoring the $H_{sync}$ and $V_{sync}$ signals. A format signal conductor 60 interconnects the mode identification counter and a sled actuator 62, which may be a solenoid or other actuator type. The sled actuator 62 is connected to the sled 40 for selectively moving the sled to appropriately register the optical integrators 28, 29 with the optical axis 15.

In operation, the mode identification counter 58 counts the number of vertical lines in a frame of data, and the average number of 50 MHz counter clocks in a line of data to determine the height-to-width format of the video data. Based on the display format determined by the mode identification counter, a format signal is sent along conductor 60 to the sled actuator 62 to appropriately register either the first or second optical integrator 28, 29 with the optical axis 15.

Alternative Embodiment No. 1

Figure 2:
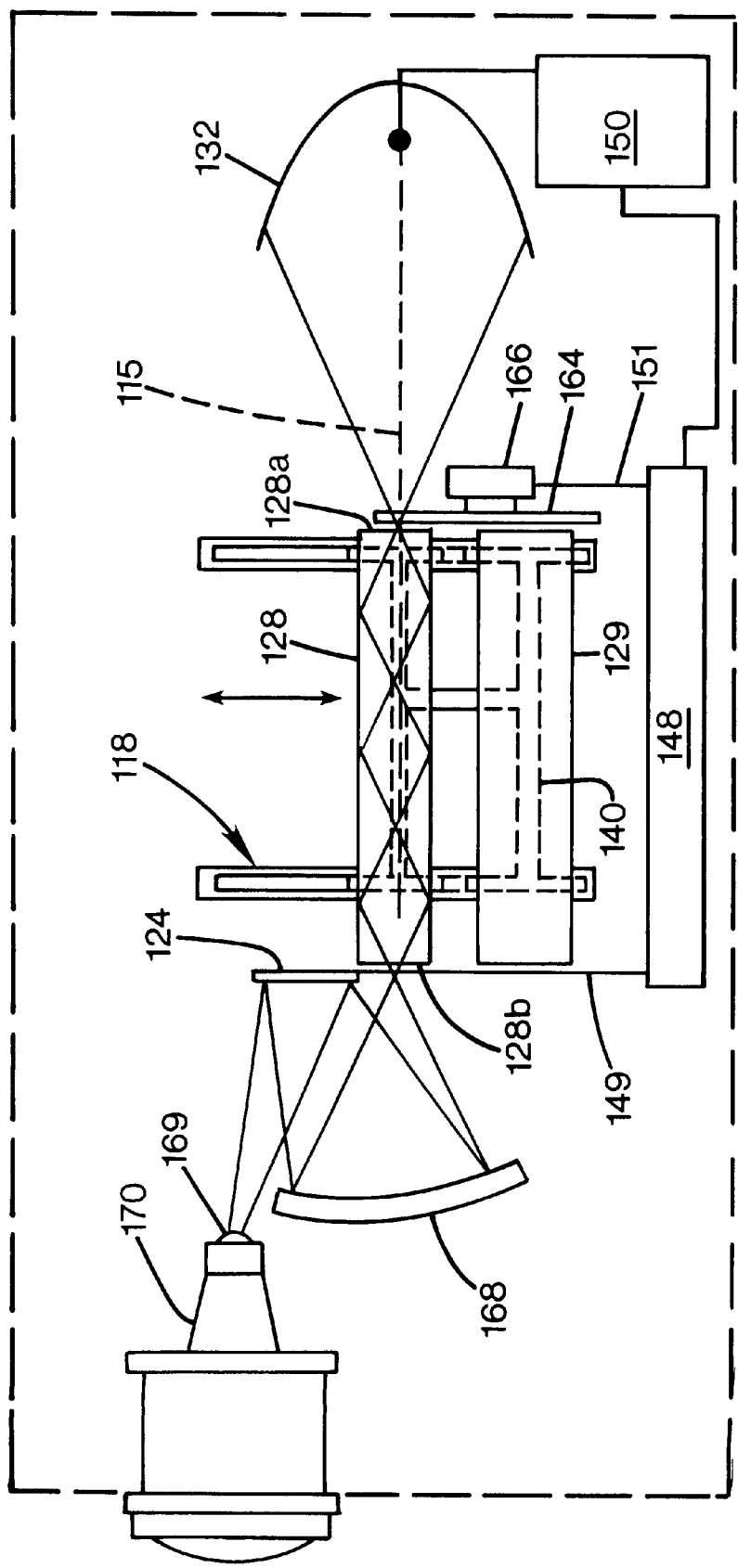
FIG. 2 is a top plan, partially cutaway view of portion of a variable format projection optical system according to another preferred embodiment of the present invention.

FIG. 2 shows an alternative embodiment of the present invention, with reference numbers in the "100" series corresponding where appropriate to reference numbers of FIG. 1. In FIG. 2, the light valve is a reflective-type light valve 124, such as a DMDT™ light valve manufactured by Texas Instruments Incorporation of Dallas Tex. A color wheel 164 is positioned downstream of the light source 132, with the periphery of the color wheel registered with the optical axis 115. The color wheel is transmissive, with red, green and blue (RGB) filters provided in alternating sectors along the periphery of the color wheel. A color wheel drive motor 166 mounted adjacent the color wheel 164 selectively rotates the color wheel.

The light valve drive electronics unit 148 containing a CPU is connected via conductors 149, 151 to the light valve 124 and the color wheel motor 142, respectively. The drive electronics unit 148 synchronizes the operation of the light valve and color wheel during projector operation. A power supply 150 provides appropriate electrical power for the light source 116 and the electronics unit 148.

A variable display format device 118 similar to the device 18 of FIG. 1 is positioned just downstream of the color wheel. The sled 140 of the display format device 118 may be manually or automatically movable as described in relation to the embodiment of FIG. 1. Referring to FIG. 2, light is transmitted through a small spot area on the color wheel periphery and is focused at the inlet port 128a of optical integrator 128. Integrated light exits the optical integrator exit port 128b, is reflected by a spherical mirror 168 onto the reflective light valve 124, and is further reflected by the reflective light valve to the entrance pupil 169 of a projection lens 170. The projection lens may be a fixed focal length lens system as shown in FIG. 2, or alternatively a zoom lens system.

Alternative Embodiment No. 2

Figure 3:
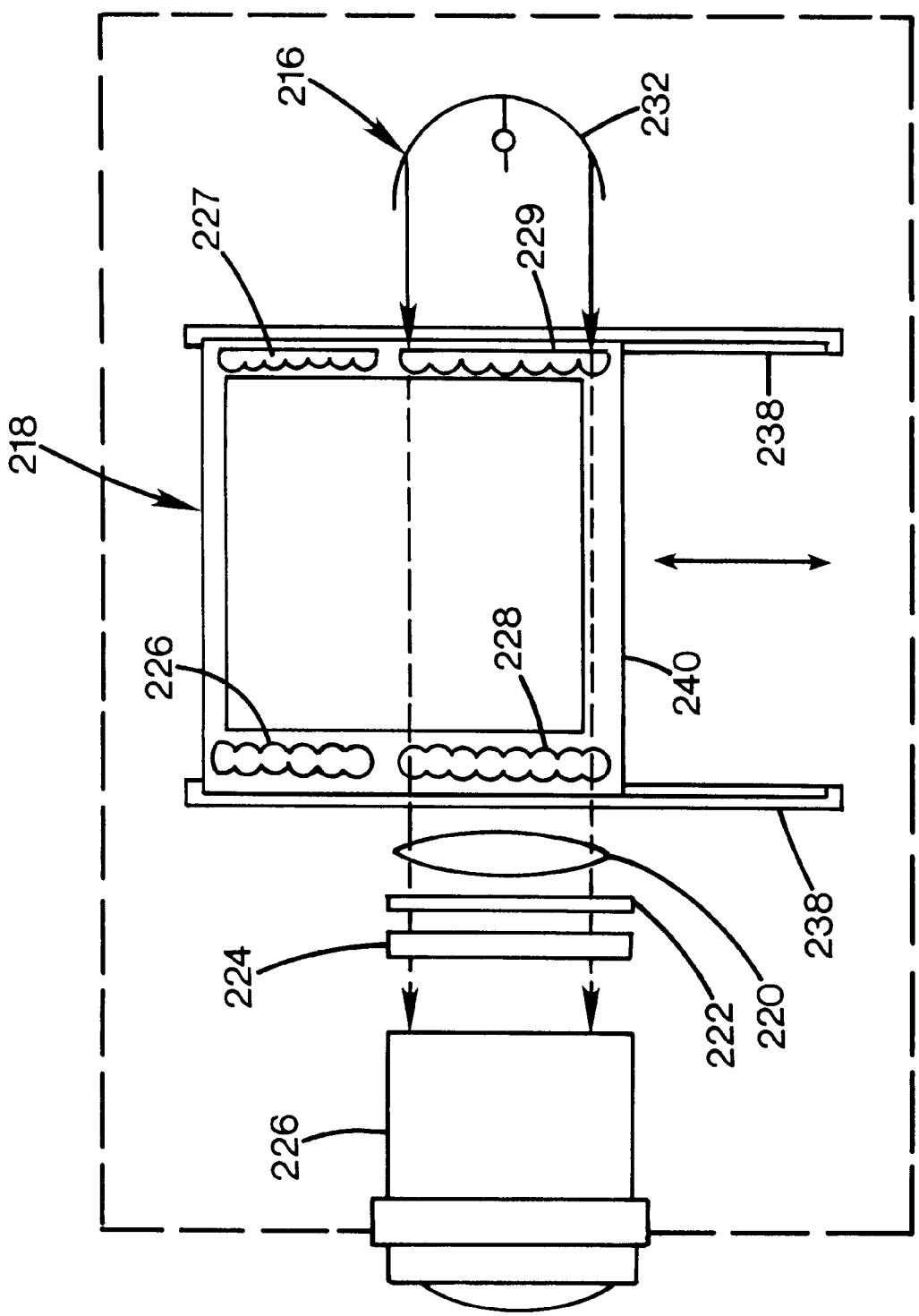
FIG. 3 is a top plan, partially cutaway view of portion of a variable format projection optical system according to another preferred embodiment of the present invention.

FIG. 3 shows an alternative embodiment of the present invention, with reference numbers in the "200" series corresponding where appropriate to reference numbers of FIG. 1. In the embodiment of FIG. 3, the optical integrators are fly-eye type lenses 226, 227, 228, 229. This alternative embodiment incorporates a transmissive light valve 224 and is otherwise similar to the embodiment shown in FIG. 1.

The light source 216 has a spherical mirror 232 to project substantially collimated light. The variable display format device 218 includes pairs of fly-eye lenses 226, 227 and 228, 229. The fly-eye lenses have rectangular cross-sections that correspond to and provide for selected display formats, such as 3×4 and 16×9. The upstream lens 227, 229 of each pair is a plano-lenticular lens, with the planar surface facing the light source 216. The downstream lens 226, 228 of each pair is a bi-lenticular lens. The lens pairs are mounted on a sled 240 that rides on tracks 238. The sled 240 may be actuated by mechanisms such as the actuator 62 and mode identification counter 58 shown in FIG. 1.

Referring again to FIG. 3, the fly-eye lens pairs integrate the collimated light and pass the light through an optional positive lens group 220, a polarizer 222, and the transmissive light valve 224. The integrated, polarized light is modulated by the light valve 224 and passed to a telecentric projection lens 226 for projection on a display screen.

It should be apparent that the invention may be embodied in other specific forms without departing from its spirit or essential characteristics. For instance, any of the optical integrators described above may be trapezoidal in cross-section, in order to offset any keystone distortion that may arise in the optical system. The construction of the variable display format device and actuator may take a variety of forms. In addition, the variable display format device may be applied to projectors using other types of reflective and transmissive light valves. Various other elements of the optical system, for instance the spherical mirror, may also be replaced by other optical imaging elements. Accordingly, the described embodiments are to be considered in all respects only as illustrated and not restrictive and the scope of the invention is, therefore, indicated by the appended claims.

What is claimed is:

1. An image projector comprising:

a light source;

a light valve positioned downstream of the light source;

an optical path extending between the light source and the light valve;

a plurality of optical integrators positioned between the light source and the light valve, each of the plurality of optical integrators being movable laterally of the optical path and positionable in the optical path, each of the optical integrator transmitting light from the light source to the light valve when positioned in the optical path, each of the optical integrators being constructed to produce a unique projection display format as light is transmitted therethrough.

2. The projector of claim 1, wherein a first of the plurality of optical integrators has a portion with a 3×4 cross-section.

3. The projector of claim 1, wherein a second of the plurality of optical integrators has a portion with a 9×16 cross-section.

4. The projector of claim 1, wherein the projector has two optical integrators.

5. The projector of claim 1, wherein the optical integrators are movably held in a track, the track being oriented such that the optical integrators are movable laterally of the optical path.

6. The projector of claim 5, wherein an actuator connected to the optical integrators is operable to automatically move one of the optical integrators into registration with the optical path.

7. The projector of claim 6, further comprising a mode identification device for sensing the display format of incoming electronic signals, and for signaling the actuator to move the one optical integrator into registration with the optical path.

8. The projector of claim 1, wherein the integrators comprise elongate structures that integrate light by means of total internal reflection.

9. The projector of claim 1, wherein the integrators comprise fly-eye type integrators.

10. The projector of claim 1, wherein the light valve is a transmissive light valve.

11. The projector of claim 1, wherein the light valve is a reflective light valve.

12. An image projector comprising:

a light source;

an electronically modulated light valve positioned downstream of the light source;

an optical path extending between the light source and the light valve; a first and a second optical integrators positioned between the light source and the light valve, each of the first and second optical integrators being movable and positionable in the optical path, the first optical integrator producing a first projection display format when positioned in the optical path, and the second optical integrator producing a second projection display format when positioned in the optical path.

13. The projector of claim 12, wherein the first projection display format is 3×4.

14. The projector of claim 12, wherein the second projection display format is 9×16.

* * * * *

UNITED STATES PATENT AND TRADEMARK OFFICE
CERTIFICATE OF CORRECTION

PATENT NO.   : 5,978,051
DATED        : November 2, 1999
INVENTOR(S)  : Jeffrey A. Gohman and Michael G. West It is certified that error appears in the above-identified patent and that said Letters Patent is hereby corrected as shown below:

<u>Title page,</u>
Insert Item [73], it should read -- Assignee: In Focus Systems, Inc., Wilsonville, Oreg. --

Signed and Sealed this

Twenty-fifth Day of June, 2002

Attest:

Attesting Officer

JAMES E. ROGAN
Director of the United States Patent and Trademark Office